(12) United States Patent
Heiss et al.

(10) Patent No.: US 6,600,748 B1
(45) Date of Patent: Jul. 29, 2003

(54) METHOD FOR OPTIMIZING THE USE OF CONNECTING SECTIONS IN ABR TRAFFIC

(75) Inventors: Herbert Heiss, Unterhaching (DE); James Kershaw, Burwood (AU)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/462,336

(22) PCT Filed: Jul. 10, 1998

(86) PCT No.: PCT/DE98/01932

§ 371 (c)(1),
(2), (4) Date: Jan. 6, 2000

(87) PCT Pub. No.: WO99/03232

PCT Pub. Date: Jan. 21, 1999

(30) Foreign Application Priority Data

Jul. 10, 1997 (DE) .......................................... 197 29 590

(51) Int. Cl.[7] .............................................. H04L 12/56
(52) U.S. Cl. ................................... 370/396; 370/395.43
(58) Field of Search ................................ 370/229, 230, 370/231, 232, 233–238, 395.1, 389, 252, 254, 428, 411, 480, 345, 344, 230.1, 235.1, 236.1, 236.2, 237, 238.1, 241, 395.21, 395.4, 395.41, 395.43, 395.65, 390

(56) References Cited

U.S. PATENT DOCUMENTS 5,805,577 A * 9/1998 Jain et al. .................... 370/234

6,069,872 A * 5/2000 Bonomi et al. ............. 370/236

FOREIGN PATENT DOCUMENTS

| EP | 0 719 012 | 6/1996 |
| GB | 2 301 977 | 12/1996 |

OTHER PUBLICATIONS

J. Liebeherr et al., "A Multi–Level Explicit Rate Control Scheme for ABR Traffic with Heterogeneous Service Requirements", IEEE (1996), pp. 570–577.
A. Koike et al., "On End System Behavior for Explicit Forward Congestion Indication of ABR Service and Its Performance", IEICE Trans. Commun. vol. E79–B, No. 4, Apr. 1996, pp. 605–610.
ATM Form 96–1172; ZS.
ATM Form 96–1267; ZS.
Traffic Management Specificaiton Version 4.0, af–tm–0056.000.

* cited by examiner

*Primary Examiner*—Dang Ton
(74) *Attorney, Agent, or Firm*—Fish & Richardson P.C.

(57) ABSTRACT

In ABR connections, control cells are inserted into the stream of ATM cells. These control cells are returned to the transmission means. In order to be able to implement an efficient control, the stream of ATM cells belonging to ABR connections is measured and supplied to a control procedure. The result of this control procedure is then potentially entered into the information part of the returned control cells.

10 Claims, 2 Drawing Sheets

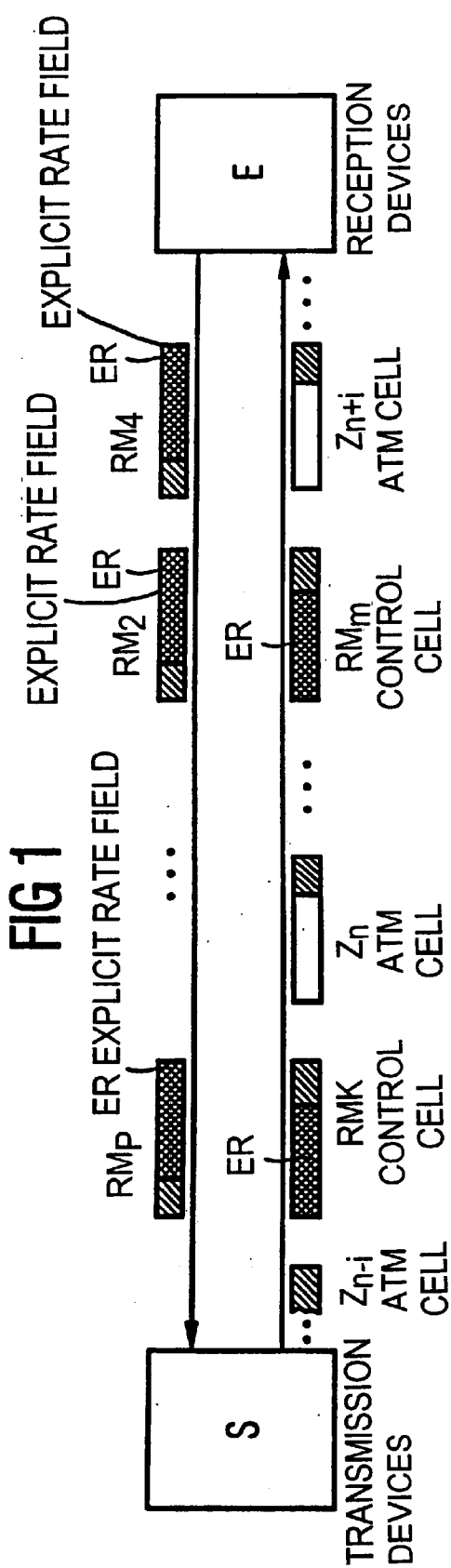

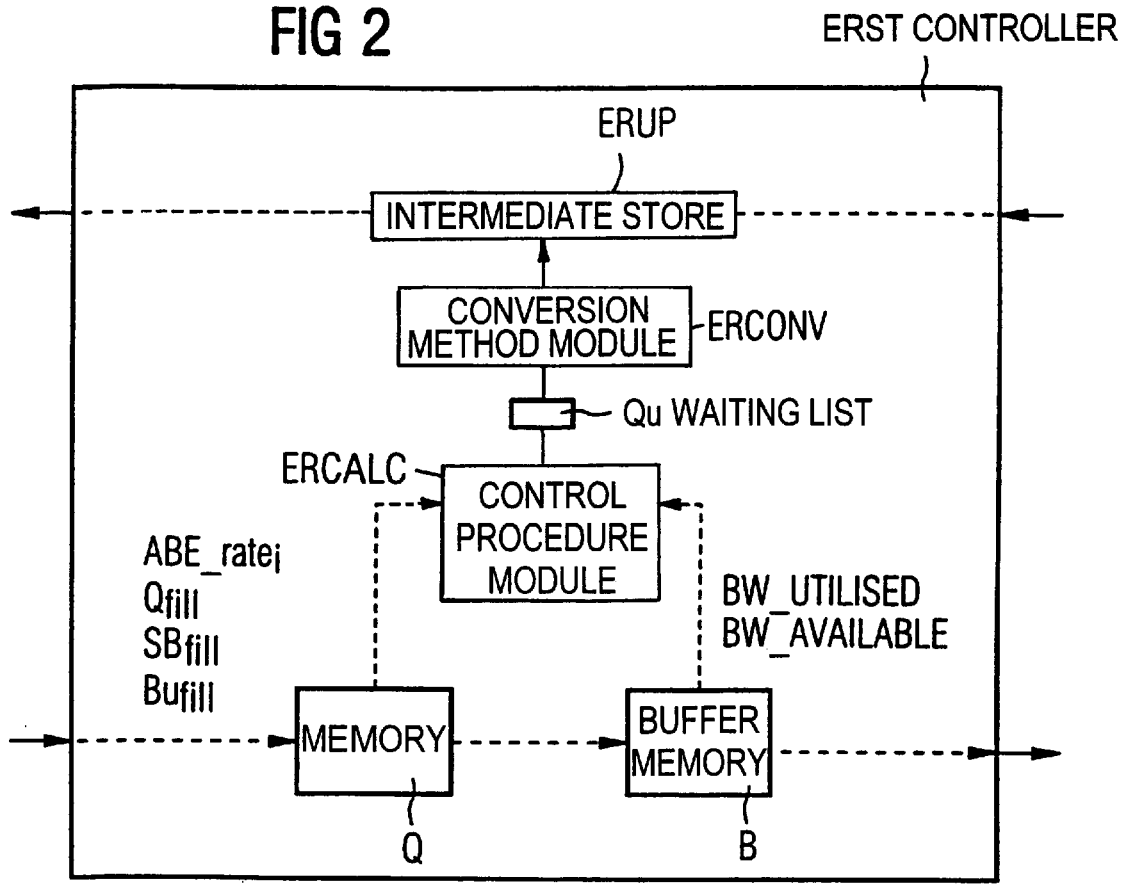

METHOD FOR OPTIMIZING THE USE OF CONNECTING SECTIONS IN ABR TRAFFIC

BACKGROUND OF THE INVENTION

1. Field of the Invention

The invention is directed to a method for optimizing the workload on connection sections for ABR traffic having ATM cells belonging to ABR traffic that are transmitted between a transmitter and a receiver via common connection sections in which control cells are inserted into the stream of ATM cells that are taken by the receiver and returned to the transmitter.

2. Description of the Related Art

A plurality of connection types have been defined for connections via which information are transmitted according to an asynchronous transfer mode (ATM). These connections types may be classified as: 1) connections with which information are transmitted with a constant bit rate (CBR) are 2) connection with via which information are transmitted with (VBR).

Connection types may also be classified as connections with which information are transmitted with an available bit rate (ABR). The latter involve connections via which information having low priority are transmitted between a transmitter and a reciever.

To achieves this, control cells are inserted in a time grid into the stream of ATM cells belonging to a connection sent out by the transmitter. As a rule, this is the case at approximately every thirty second ATM cell. The ATM cells are then supplied to the reciever, into consideration together with the control cells. The latter takes the ATM cells bearing the payload information from the cell stream. Additionally, the control cells are taken and sent back to the transmitter together with call-associated data as well as data describing the current condition of the connection sections. From there, the connection-associated information are taken from the control cells and the transmission rate is potentially reduced.

European Patent Application EP 0 719 012 A discloses a method for traffic steering and overload defense for packet-oriented networks. A virtual connection between a source node and a destination node via which ATM cells are routed is set up between these nodes. When the resources of a virtual connection are not fully utilized, the transmission rate is raised. When the resources of a virtual connection lie beyond the capacity limit of the transmission path, the transmission rate is reduced. The dynamics of the transmission event is deteriorated since the measuring of the ATM cells occurs within a fixed time span.

The publication, "A Multi-Level Explicit Rate Control Scheme for ABR Traffic with Heterogeneous Service Requirements", Jörg Liebeherr et al., Proceedings of the 16$^{th}$ Int. Conf. on distributed computing systems, Hong Kong, May 27–30, 1996, No. 16, pp. 570–577, likewise discloses a method for overload defense given ABR traffic, and mentions theoratical considerations about a multi-stage method that cannot be transferred to practical conditions without further effort. The presents specification does not address how the measuring of the ATM cells belonging to ABR traffic is to ensue, however.

Finally, the publication, "On End System Behavior for Explicit Forward Congestion Indication of ABR Service and Its Performance", Arata Koike et al., IEICE Transactions on communications, Vol. E79-B, No. 4, Apr. 1, 1996, pp. 605–610, likewise yields a method for overload defense in ABR traffic. Here, too, theoretical considerations based on simulations are provided that can likewise not be transferred to practical, conditions without further effort. The present specification does not address how the measuring of the ATM cells belonging to ABR traffic should ensue, however.

The proposal to the ATM Forum 96-1172 proposes that ATM cells belonging to ABR traffic be controlled according to the criterion of a predetermined algorithm (ERICA). The present specification does not address how this is to be implemented under practical conditions, however, is not addressed here.

SUMMARY OF THE INVENTION

The invention is based on the object of disclosing a way of controlling ATM cells belonging to ABR traffic in an efficient way.

This is achieved by a method having steps of measuring a the frequency of occurrence of ATM cells in a connection-associated manner during a transmission in a forward transmission direction, producing a measured result, measuring further parameters, triggering a control procedure by the step of measuring a frequency of occurrence, supplying the measured frequency result to a control procedure together with further, measured parameters, thus producing a calculated rate value, entering the calculated rate value by the control procedure into the control cells transmitted in the return transmission direction if the calculated rate value is greater than a rate value carried along in said control cells, and adapting the transmission rate in the transmitter to the rate value contained in the control cells if the rate value contained in said control cells is different from an original rate value stored in said transmitter.

Measuring the frequency of occurrence of the ATM cells belonging to ABR traffic is particularly advantageous in the invention. According to the criterion of measuring further parameters, these measurements are then subjected to a control procedure. The result of these calculations is inserted into the information part of the return-transmitted control cells.

Advantageous developments of the invention are discussed below.

The invention also provides that the other measured parameters are direct, connection-associated parameters that are a measure for the current filling level of the waiting list, the current filling level of the scheduler block, as well as the current filling level of the parameters calculated as sum of the scheduler blocks. This yields the advantage that a current image of the connection is present in the switch. The term "scheduler block" defines a group of connections via which ATM cells are respectively conducted and are multiplexed onto a single connection section or virtual path with a predetermined peak bit rate.

The invention also provides that the other measured parameters are indirectly connection-associated parameters that are a measure for the momentary rate that the scheduler block has used for all ABR connections of the appertaining scheduler block and/or that are a measure for the momentary rate that would be free for the sum of all ABR connections of the appertaining scheduler block.

The invention also provides that the result of the measurement of the frequency of occurrence of the ATM cells, together with the other measured parameters, is stored after the measuring procedure in at least one input waiting list before they are supplied to the control procedure as input parameters.

The invention also provides that the result of the control procedure is stored in a first waiting list, is subsequently converted into an exponential format and is entered into the control cells. The conversion into an exponential format yields the advantage that an especially efficient storing of the identified value can be implemented. The storing of the result of the control procedure in the first waiting list yields the advantage that potentially occurring speed fluctuations of the control procedure can be compensated.

The invention also provides that the ATM cells are briefly stored in a second waiting list during the measuring procedure, in order to be able to implement a read event of the VCI/VPI number stored in the information part of an ATM cell. This advantageously allows co-utilizing the storing required for the statistical multiplexing for the measuring procedure.

BRIEF DESCRIPTION OF THE DRAWINGS

The invention is explained in greater detail below with reference to an exemplary embodiment.

Shown are:

FIG. 1 is a flow diagram illustrating the underlying conditions in ABR traffic;

FIG. 2 is a flow diagram illustrating the inventive method.

FIG. 3 shows the conversion method in pseudo code.

DESCRIPTION OF THE PREFERRED EMBODIMENTS

FIG. 1 shows how ATM cells $Z_{n-1}$, $Z_n$, $Z_{n+1}$ belonging to an ABR connection are transmitted between a transmission and reciever. Accordingly, transmission devices S and reception devices E are shown. The transmission devices S can comprise a plurality of transmission devices (not shown in FIG. 1); the reception devices E can likewise comprise a plurality of reception devices (not shown in FIG. 1). A common connection section, on which the ATM cells proceeding from a transmitter are transmitted to the reciever coming into consideration, is arranged between the plurality of transmission devices S and the further plurality of reception devices E. In practice, ATM cells of different connection types are conducted over the common connection section. The ATM cells belonging to the respective connections must be subjected to a control unit on the common connection section, the ATM cells to be transmitted according to the prescription thereof. The corresponding theories are closely connected to the theory of statistical multiplexing.

Since ATM cells of different connection types are usually conducted over the common connection section, a number of transmission parameters must be defined for describing these connections, including, e.g.:1) the peak cell rate (PCR), involving an upper limit for the plurality of cells that can be transmitted per second by a transmitter), and 2), a minimum cell rate is (MCR), which defines the minimum rate with which the ATM cells can be sent, as seen from the view point of the transmitter. As seen from the view point of the connection network (switch), the MCR defines the minimum throughput rate that the switch must reserve on the connection section.

According to FIG. 1, control cells $RM_k$, $RM_m$ are inserted, by one of the transmission devices in an approximate time grid into the stream of ATM cells belonging to an ABR connection. The ATM cells are supplied to the reciever together with the control cells, which defines a forward direction. The reciever takes the ATM cells carrying the payload information and interprets the corresponding information. Furthermore, the control cells $RM_1 \ldots RM_p$ are taken from the cell stream and conducted back to the transmitter, which defines a return direction.

During the connection setup, an extremely high peak cell rate is deposited in the information part of such a control cell $RM_x$. To accomplish this, a specific field ER (explicit rate field) is provided in the information part of the control cell. The stream of the ATM cells is checked in every switch involved in the transmission to see whether the entered peak cell rate of this ABR connection can be adhered to on the basis of the momentarily prevailing workload.

To this end, respective measurements of the throughput rate as well as further connection-related parameters are implemented and are supplied as input quantities to a control procedure sequencing in the control procedure module ERCALC. Since the control cells are resupplied to the transmitter in the return direction via the same switch, the rate value calculated according to the prescription of the calculating algorithm may potentially be entered again in the information part of the control cell RM in this switch. This information is forwarded to the transmitter, where it is taken and compared to the information that was originally deposited there.

FIG. 2 shows the inventive method in detail on the basis of only one controller ERST arranged in a switch, through which, the ATM cells of all ABR connections pass through this control means ERST. This controller ERST measures the incoming ABR cells connection-individually and provides the control cells RM transmitted in return direction with the calculated information.

The controller ERST first first briefly intermediately stores the incoming ABR cells in a waiting list fashioned as memory Q. During this time, the virtual channel number VCI or, respectively, the virtual path number VPI, is taken from the cell header. Since an allocation between the values VCI/VPI and the connection type was produced at the beginning of the connection setup, a determination as to the type of connection to which the current connection belongs can be made on the basis of the virtual numbers VCI/VPI. In particular, ATM cells belonging to ABR connections can thus be verified. This is a critical point of view insofar as ATM cells of all connection types pass through the switch, i.e., ATM cells of CBR or VBR traffic. The arrival rate $ABR\_rate_i$ is potentially identified given the arrival of ATM cells belonging to an ABR connection i. In addition, further directly connection-associated parameters are measured. These include the current filling level of the (connection-associated) waiting list $Q_{fill}$, the current filling level of the scheduler block $SB_{fill}$, as well as the current filling level of the parameters $Bu_{fill}$ calculated as sum of the scheduler blocks. After such a measurement has occurred, the measured parameters are supplied to an input waiting list of the control procedure module ERCALC.

These measured parameters are employed as input quantities for the control procedure module ERCALC. After the measuring event, the ATM cell belonging to an ABR connection is in turn enabled according to the measure of a statistical multiplexing algorithm (for example, waited fair queing) and is supplied to a further buffer memory B. A quantity BW_UTILISED is determined in buffer memory B which reproduces the traffic load on the connection section that is not connection-associated. This represents the momentary rate that the scheduler block has used for all ABR connections of the appertaining scheduler block. Furthermore, a quantity BW_AVAILABLE is determined in the buffer memory B, which reproduces the momentary rate that would be free for the sum of all ABR connections of the appertaining scheduler block. These measurements are triggered cyclically at the output by a scheduler block-related event, whereas the measurements of the input side are triggered by connection-associated events. The measured values (of the output side) are stored in a further input waiting list (not shown in FIG. 2) and are supplied to the control procedure running in the control procedure module ERCALC, being likewise supplied as input parameters.

A number ER, (explicit cell rate) is determined as a result of the control procedure, this reproducing the rate that the switch has allocated for this connection. It is expressed in cells per second. It is greater than or equal to the predetermined, minimum cell rate $MCR_i$ of the connection i and is stored in the control procedure module ERCALC, whereby the prescribed, minimum cell rate $MCR_i$ is always greater than or equal to one cell/sec. The storing can thereby take place in the form of a chained list.

A conversion into an exponent/mantissa format is still required in order to be able to to hand over the rate value determined in this way to one of the control cells RM transmitted in return direction. According to ATM Forum, this is defined by:

$$2^e (1+m/512) \text{ for } 0 \leq m < 512$$

Before the calculated rate value ER, determined by the control procedure is supplied to the conversion method sequencing in the conversion method module ERCONV, a further intermediate storing takes place in the waiting list QU shown in FIG. 2.

FIG. 3 shows the conversion method in pseudo coded which begins by setting e to a value of 9; e can range in value from 0 to an order of magnitude of 32. By way of example the if, maximum e value lies at 18 for a 150 mbit connection, then, a start value of 9 lies roughly in the middle of this bandwidth. Dependent on whether the measured ER value is greater than or less than 512, the e value is counted up or, respectively, down. A start value with e=0 functions in exactly the same way but requires substantially less time in order to proceed, for example, to the e value of e=18. The conversion method according to FIG. 3 involves a dynamics advantage in this respect.

These calculations determine the number of cells per second in an exponent/mantissa format producing a calculated rate valve. When a control cell RM passes the controller ERST in a return direction, the ER field of this control cell is updated. This ensues in that the appertaining control cell RM is briefly intermediately stored in an intermediate store ERUP. When the value residing in the ER field of the control cell RM is greater then the calculated rate value, $ER_c$ the calculated rate value $ER_c$ is entered into the information part of this control cell, implying that this connection is in an overload condition. The transmitter identifies this condition by comparing the entered calculated rate value $ER_c$ to a rate internally stored at the beginning of the transmission event, and enters a reduced value for a renewed transmission.

When the rate value $ER_{RMP}$ residing in the ER field is lower than the calculated rate value $ER_c$, the original value entered in the information part of the control cell is retained. The transmitter thus need not enter a new value for newly pending transmissions.

The above-described method is illustrative of the principles of the present invention. Numerous modifications and adaptions thereof will be readily apparent to those skilled in this art without departing from the spirit and scope of the present invention.

What is claimed is:

1. A method for optimizing the workload on connection sections given ABR traffic, comprising the steps of:

transmitting ATM cells belonging to ABR traffic between a transmitter and a receiver via common connection sections, a forward transmission direction being thus defined;

inserting control cells into a stream of said ATM cells that are taken by said receiver and returned to said transmitter, a return transmission direction being thus defined;

measuring a frequency of occurrence of said ATM cells on a connection-associated basis during said transmission in said forward transmission direction, producing a measured result;

measuring further, measured parameters;

triggering a control procedure by said step of measuring a frequency of occurrence;

supplying said measured frequency result to said control procedure together with said further, measured parameters, producing a calculated rate value;

entering said calculated rate value by said control procedure into said control cells transmitted in said return transmission direction if said calculated rate value is greater than a rate value carried along in said control cells; and adapting a transmission rate in said transmitter to said rate value contained in said control cells if said rate value contained in said control cells is different from an original rate value stored in said transmitter.

2. A method according to claim 1, wherein:

said further, measured parameters are direct, connection-associated parameters that comprise a measure for a current filling level of a waiting list, a current filling level of one of a plurality of scheduler blocks, as well as a current filling level of parameters calculated as a sum of said plurality of scheduler blocks.

3. A method according to claim 1, wherein:

said further measured parameters are indirectly connection-associated parameters that comprise a measure for a monetary rate that a scheduler block has used for all the ABR connections of an appertaining scheduler block or a measure for a momentary rate that would be free for a sum of all ABR connections of said appertaining block.

4. A method according to claim 1, further comprising the step of:

storing said measured result, together with said further, measured parameters in an input waiting list after said step of measuring said frequency of occurrence before said measured result and said further, measured parameters are supplied to said control procedure as input parameters.

5. A method according to claim 1, further comprising the steps of storing said calculated rate value in a first waiting list;

subsequently converting said calculated rate value into an exponential format producing a converted calculated rate value; and entering said converted calculated rate value into said control cells.

6. A method according to claim 1, further comprising the step of briefly storing said ATM cells in a second waiting list during said step of measuring said frequency of occurrence.

7. A method according to claim 5, wherein said step of converting said calculated rate value further comprises the step of selecting a start value of e=9 for exponents that are greater than zero.

8. A method according to claim 5, wherein said step of converting said calculated rate value further comprises the step of supplying an exponent e and a mantissa M, wherein $0 \leq m \leq 512$ and $2^e (1+(m/512))$ which corresponds to said calculated rate value.

9. A method according to claim 8, wherein said step of supplying an exponent e and a mantissa M, further comprises the step of incrementing e by 1 in steps for conversion of said calculated rate value that is higher than 1023, until the correct corresponding value of the exponent is reached.

10. A method according to claim 8, wherein said step of supplying an exponent e and a mantissa M, further comprises the step of decrementing e by 1 in steps for conversion of said calculated rate value that is lower than 512, until the correct corresponding value of the exponent is reached.

* * * * *